US008726395B2

(12) United States Patent
Gomez et al.

(10) Patent No.: US 8,726,395 B2
(45) Date of Patent: May 13, 2014

(54) METHODS AND COMPUTER SYSTEMS FOR DOCUMENT ENCRYPTION

(75) Inventors: Laurent Gomez, Le Cannet (FR); Cedric Hebert, Mouans Sartoux (FR); Cedric Ulmer, Nice (FR)

(73) Assignee: SAP AG, Walldorf (DE)

( * ) Notice: Subject to any disclaimer, the term of this patent is extended or adjusted under 35 U.S.C. 154(b) by 2389 days.

(21) Appl. No.: 11/052,212

(22) Filed: Feb. 8, 2005

(65) Prior Publication Data

US 2005/0235165 A1    Oct. 20, 2005

(30) Foreign Application Priority Data

Feb. 9, 2004    (EP) .................................... 04002803

(51) Int. Cl.
*G06F 21/00*    (2013.01)

(52) U.S. Cl.
USPC .......................................................... 726/26

(58) Field of Classification Search
USPC ............................................ 713/193; 726/26
See application file for complete search history.

(56) References Cited

U.S. PATENT DOCUMENTS

| 2002/0138652 | A1* | 9/2002 | Taylor | 709/246 |
|---|---|---|---|---|
| 2004/0181679 | A1* | 9/2004 | Dettinger et al. | 713/193 |
| 2004/0249892 | A1* | 12/2004 | Barriga et al. | 709/206 |
| 2004/0267900 | A1* | 12/2004 | Hoekstra et al. | 709/217 |
| 2005/0235165 | A1* | 10/2005 | Gomez et al. | 713/193 |

FOREIGN PATENT DOCUMENTS

WO    WO03/050715    6/2003

OTHER PUBLICATIONS

"Safer XML" by Webreference.com published on Jan. 6, 2003.*
Partial Encryption Schemes for Matching Pursuit Leimhofer, G. ; Uhl, A. Signal Processing and Communications, 2007. ICSPC 2007. IEEE International Conference on Digital Object Identifier: 10.1109/ICSPC.2007.4728612 Publication Year: 2007 , pp. 1487-1490.*
Uehara, Takeyuki. "Contributions to image encryption and authentication." University of Wollongong Thesis Collection (2003): 430.*
European Communication and Search Report, dated Feb. 3, 2005, issued in European Application No. 04002803.7, 7 pages.
Cedric Ulmer et al., "3G Mobile Context Sensitive Adaptability—User Friendly Mobile Work Place for Seamless Enterprise Applications," Apr. 7, 2003, retrieved from the Internet: URL:http://www-sop.inria.fr/intech/device/slides_sap.pdf>, pp. 1-18.

(Continued)

*Primary Examiner* — Bradley Holder
*Assistant Examiner* — Harris Wang
(74) *Attorney, Agent, or Firm* — Finnegan, Henderson, Farabow, Garrett & Dunner, LLP

(57)    ABSTRACT

Methods and systems are provided for document encryption. In one embodiment, an adaptation engine is provided for partial encryption of a document. The adaptation engine may include a paginator for paginating the document into at least one sub-page according to characteristics of a specific device class. The adaptation engine may further include an encryptor for separately encrypting a to-be-encrypted element of the at least one sub-page using a partial encryption mechanism known by a client device that belongs to the specific device class.

22 Claims, 3 Drawing Sheets

(56) References Cited

OTHER PUBLICATIONS

Consensus Project: "Deliverable D7 Adaptation Engine Installation and Configuration Guide Version 3.0," Mar. 31, 2003, Consensus Project No. IST-2001-32407, Retrieved from the Internet: URL:http://www.consensus-online.org/publicdocs/D7public.pdf>, 51 pages.

Consensus Project: "Deliverable D5 Architecture and Design Document of the Prototype," Feb. 28, 2003, Consensus Project No. IST-2001-32407, Retrieved from the Internet: URL:http://www.consensus-online.org/publicdocs/Consensus_32407_D5_ExecSum.pdf>, 5 pages.

W3C, "XML Encryption Syntax and Processing," Dec. 10, 2002, W3C Word Wide Web Consortium, Retrieved from the Internet: URL:http://www.w3.org/TR/xmlenc-core/>, 43 pages.

Vipul Gupta et al., "Experiments in Wireless Internet Security," IEEE Wireless Communications and Networking Conference Record, vol. 2, Mar. 17, 2002, pp. 860-864.

European Patent Office Communication, Summons to attend oral proceedings pursuant to Rule 115(1) EPC, dated Nov. 5, 2008, issued in European Application No. 04002803.7 (6 pages).

Kirda Engin et al., "Web Service Engineering with DIWE" 2003, EUROMICRO '03, 2003.

* cited by examiner

METHODS AND COMPUTER SYSTEMS FOR DOCUMENT ENCRYPTION

BACKGROUND

1. Technical Field

The present invention generally relates to electronic data processing. More particularly, embodiments of the present invention relate to methods, computer program products and computer systems for document encryption.

2. Background Information

W3C XML Encryption provides a framework for encrypting/decrypting parts of an XML document, where a part can be in the range from the whole document to the content of an element. An XML encryption tag surrounds the parts that need to be encrypted by a corresponding server. XML Encryption also describes how to decrypt the encrypted data. XML Encryption can be applied to any Web resource including non-XML content. Privacy policies may be applied to Web resources through the Platform for Privacy Preferences (P3P). For instance, P3P can describe that information retrieved from the client is to be shared with commercial partners.

JCETaglib is a set of Open Source JSP tags, communicating with Sun Microsystem's JCE (Java Cryptographic Extensions) library to bring encryption to JSP applications. JCETaglib is based on the JCE java library from Sun Microsystems and allows one to define which part of an HTML document should be encrypted. Encrypt JCETags can be used to describe which clear text within a document is to be encrypted and XML can be used to describe how to decrypt data with a EncryptedData tag.

However, known encryption tools suffer from several drawbacks. For example, these tools do not allow one to describe for a client device which parts of a document need to be encrypted after the document has been processed by the client and before the data is sent back to the server. Further, these tools do not address the issue of pagination. For example, typically, a document sent to a device needs to be paginated according to the display area of the device. Mobile devices with limited display areas typically require the document to be displayed on multiple pages if the document does not fit into a single page. If the document includes sensitive portions, the whole document is encrypted when using prior art encryption. The encrypted document cannot be paginated and, therefore, once the document is received by the client, it cannot be opened and processed at the client side.

In view of the foregoing, there is a need for improved methods, software applications and computer systems for document encryption. There is also a need for such methods and systems that are capable of addressing one or more of the drawbacks of known encryption tools, such as those identified above.

The above description is based on the knowledge of the present inventors and not necessarily that known in the art.

SUMMARY

As further disclosed herein, embodiments of the present invention encompass server computers, client device systems, server-side methods, client-side methods and corresponding computer program products that are capable of solve one or more of the above-described problems.

In accordance with one embodiment, a server-side adaptation engine is provided for paginating a document first and then encrypting only those parts of a generated sub-page that need encryption.

Each page of the document may be paginated to not exceed the limit size allowed for a specific device or device category. By using fine-grained encryption only applied to specific parts of the sub-pages, the bandwidth required for transmitting a sub-page can be reduced because encrypting a document augments its size.

Embodiments of the invention enable a document author to encrypt only specific parts of a document and, at the same time, to gain device independence with regards to the display of the document at client devices belonging to various device classes. Device classes (e.g., PDA class, Wired Phone class, WAP Phones class) can be defined as sets of devices having similar technical characteristics.

In one embodiment of the invention, a client device receives a sub-page generated by the inventive adaptation engine, and, in return, the client device itself can apply partial encryption to the received sub-page by using the encryption information that was generated by the server's adaptation engine.

The above-described embodiment may enable the client device to automatically encrypt data entered by a user before sending the data back to the server.

Additional objects and advantages of the various embodiments of the invention will be set forth in part in the description, or may be learned by practice of the invention. The objects and advantages of the embodiments of the invention will be realized and attained by means of the elements and combinations particularly pointed out in the appended claims. Embodiments of the invention are disclosed in the detailed description section and in the appended independent and dependent claims.

The various embodiments can include and/or exclude different aspects, features and/or advantages, where applicable. In addition, various embodiments can combine one or more aspects or features of other embodiments, where applicable.

It is understood that both the foregoing general description and the following detailed description are exemplary and explanatory only and are not restrictive of the embodiments of the invention, as claimed. The description of aspects, features and/or advantages of particular embodiments should not be construed as limiting other embodiments or the claims.

BRIEF DESCRIPTION OF THE DRAWINGS

The accompanying drawings, which are incorporated in and constitute a part of this specification, illustrate several embodiments of the invention and together with the description, serve to explain the principles consistent with the present invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
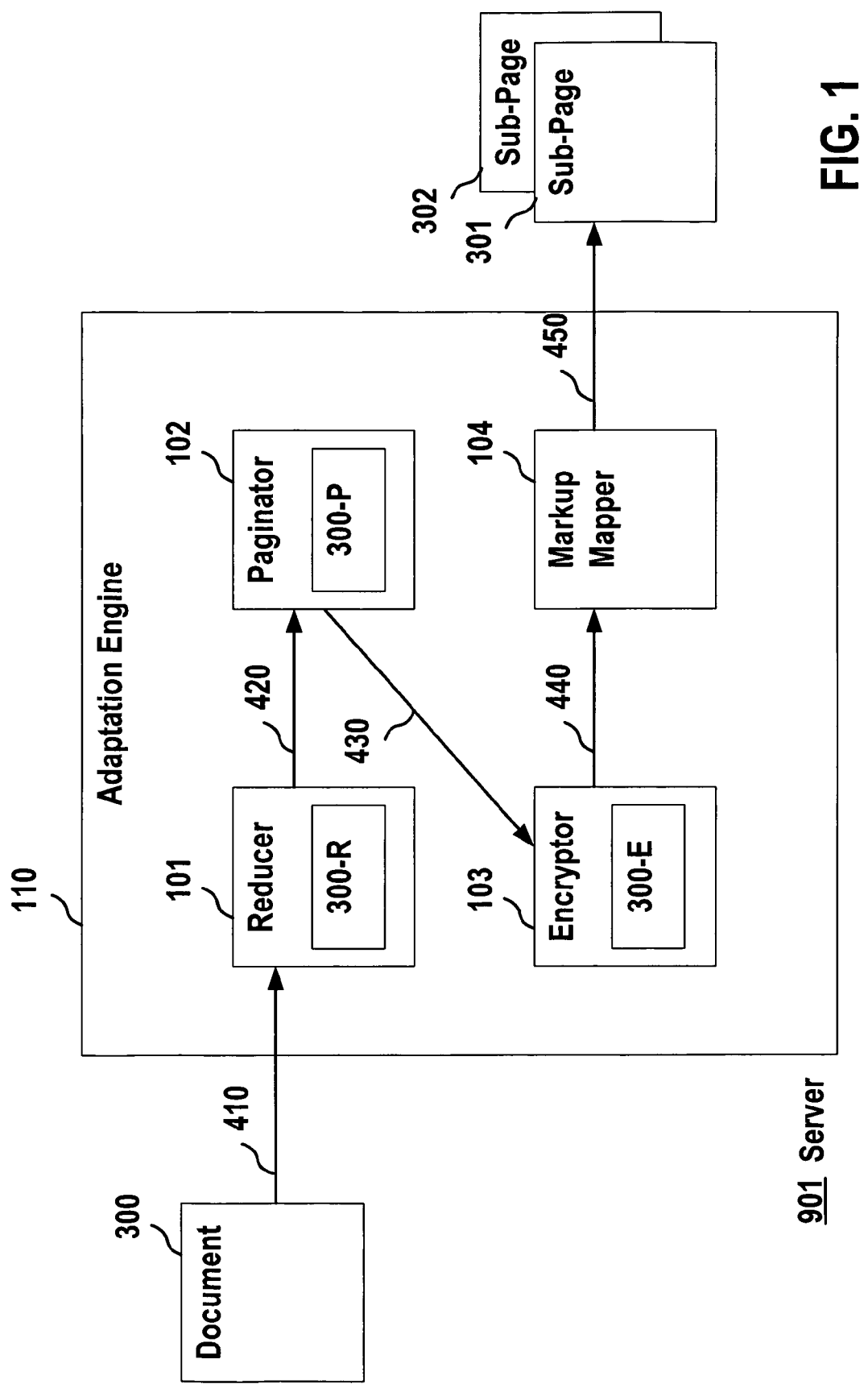
FIG. 1 is a block diagram of an exemplary computer system, consistent with an embodiment of the invention, that may be used for device independent document development.

FIG. 1 is a block diagram of an exemplary server computer 901, such as an application server, that may be used for device independent document development.

As shown in the exemplary embodiment of FIG. 1, the computer 901 may include an adaptation engine 110. The adaptation engine 110 can be based on an adaptation engine, such as the Consensus Adaptation Engine as described on the Consensus web site (see www.consensus-online.org) under the Project Acronym CONSENSUS, Project No. IST-2001-32407. The Consensus Adaptation Engine architecture includes a reducer for removing parts of a document that are not relevant for a specific client device class, a paginator for splitting a document into several sub-pages if required by the device characteristics or user preferences, and a markup mapper for transforming the original UI description into a UI language understood by the device.

The adaptation engine 110 may be used to adapt a document 300 for processing by various devices, such as mobile phones, PDAs, Laptops, etc. Various device classes have different characteristics, such as different limited display areas, that may require a large document 300 to be split into multiple sub-pages 301, 302.

When, for example, in response to a corresponding request from a client device, the adaptation engine 110 receives 410 the document 300, various components (e.g., reducer 101, paginator 102, encryptor 103, and markup mapper 104) of the adaptation engine 110 may be used to generate 450 the corresponding sub-pages 301, 302 in compliance with the characteristics of the requesting client device.

For example, upon request from a client, the document 300 can be processed by the application server 901. The document 300 can be a structured document and may include a user interface description in an XML based device independent language (e.g., Renderer Independent Markup Language RIML). It may also contain sensitive data within encryption tags. An encryption tag contains information about the algorithm to be used for encryption of the sensitive data, as well as about how to decrypt it.

The document 300 can be stored in a memory portion of the computer 901 or can be accessed at any other data storage through a corresponding interface of the computer 901.

Coding section 1 is an XML-based example of a body portion of document 300.

Coding Section 1: Document 300

```
<body>
    <h1 deviceClassOneOf="DC0">
        hello mobile phone </h1>
    <h1 deviceClassOneOf="DC3">
        hello PDA
    </h1>
    <b>
    card number is <encrypt> 123456789 </encrypt>
    </b>
    <P>
</body>
```

In the upper portion of coding section 1, the document 300 includes two instructions referring to two different device classes "DC0", "DC3". The lower portion includes a card number, such as a credit card number of the user, that is subject to encryption.

In the embodiment of FIG. 1, the reducer 101 may eliminate portions of the document 300 that do not comply with the requirements of the device class of the requesting client device. Coding section 2 shows the body portion of the reduced document 300-R.

Coding Section 2: Reduced Document 300-R:

```
<body>
    <h1 deviceClassOneOf="DC3">
        hello PDA
    </h1>
    <b>
    card number is <encrypt> 123456789 </encrypt>
    </b>
    <p>
</body>
```

In this example, the adaptation engine has recognized that the requesting client device belongs to the device class "DC3". Therefore, the instructions referring to device class "DC0" are removed from the original document.

A further example for removal is, for example, removal of elements dedicated to voice browsers if the requesting client device is not voice enabled. Even elements included in the encrypt tag can be removed from the document. If the encrypt tag remains empty, the tag may also be removed.

The paginator 102 may receive 420 the reduced document 300-R from the reducer 101 and perform a pagination that complies with the requirements of the corresponding device class "DC3". If no reduction is required, the paginator 102 may receive the original document 300 instead. Coding section 3 is an example of the content of two sub-pages that may result in paginated document 300-P.

Coding Section 3: Paginated Document 300-P

```
Sub-page 1:
<body>
    <h1>
        hello PDA
    </h1>
</body>
Sub-page 2:
<body>
    <b>
        card number is <encrypt> 123456789 </encrypt>
    </b>
    <p>
</body>
```

In this example, the paginator 102 creates a first sub-page for displaying "hello PDA" and a second sub-page for displaying the encrypted credit card number on the "DC3" device.

Elements included in the encrypt tag may also be taken into account by the pagination algorithm. In case the content of the encrypt tag needs to be paginated, the paginator 102 can generate corresponding encrypt tags in each corresponding sub-page having the same encryption/decryption modalities as the initial encryption tag.

Once the reduced document is paginated, the encryptor 103 receives 430 the paginated document 300-P. A partial encryption algorithm may be applied to those portions of the paginated document indicating that encryption is required. As a basis for XML content encryption, the W3C XML Encryption specification can be used. However, any other encryption mechanism supporting partial encryption to separately encrypt a to-be-encrypted element of a document may be used as well (e.g., the jCETaglib).

Coding section 4 is an example of the encrypted document 300-E.

Coding Section 4: Encrypted Document 300-E

```
Sub-page 1:
<body>
    <h1>
        hello PDA
    </h1>
</body>
Sub-page 2:
<body>
    <b>
        card number is
        <EncryptedData
        Type=
        'foo/xmlenc#Element'
            xmlns='foo/xmlenc#'>
            <CipherData>
                <CipherValue>
                    5hJGkd
                </CipherValue>
            </CipherData>
        </EncryptedData>
    </b>
    <p>
</body>
```

In the example, the encryption is applied only to the card number that was located between the <encrypt></encrypt> tags. These tags are used by the encryptor 103 to identify all parts requiring partial encryption within the various sub-pages.

The encryptor 103 encrypts the corresponding data of the generated sub-pages using an encrypt tag that is understood by the client device. If the client device is able to use XML Encryption, the encryptor can generate the EncryptedData tag. If the client device is not able to use such a language, the server can delegate security to a lower level, e.g., HTTPS/SSL for the HTML browsers.

After the encryption, the markup mapper 104 receives 440 the encrypted document 300-E to transform the not encrypted parts of the encrypted document 300-E into a description language known by the client device. The encrypted data may be translated into a client device compatible language already during the encryption process. Coding section 5 is an example of the markup mapped document that includes the sub-pages 301, 302, which are now ready to be sent to the client device.

Coding Section 5: Markup Mapped Document Sub-Pages 301, 302:

```
Sub-Page 1 (→ sub-page 301)
<body>
    <h1>
        hello PDA
    </h1>
</body>
Sub-Page2 (→ sub-page 302):
<body>
    <b>card number is
    <EncryptedData
    Type='foo/xmlenc#Element'
        xmlns='foo/xmlenc#'>
        <CipherData>
            <CipherValue>
                5hJGkd
            </CipherValue>
```

-continued

```
        </CipherData>
    </EncryptedData>
    </b>
    <p></p>
</body>
```

In the example, the markup mapper 104 may complete the <p> tag with the </p> tag.

Dependent on the session state of the client device, one of the sub-pages 301, 302 is sent to the client device to answer the client's request.\

In case the whole document would be encrypted prior to being sent to the adaptation engine 110 by a conventional encryption engine, the adaptation engine would not be able to adapt the content, as it cannot access it. If only a part of the document is encrypted, the paginator does not know how to handle this part. Positioning the encryptor within the adaptation engine 110 allows one to integrate the pagination and encryption processes so that they can be applied also to multiple page documents suitable for various device classes. In other words, integrating the encryption engine (encryptor 103) within the adaptation engine 110 allows the adaptation engine to paginate to-be-encrypted data into encrypted sub-pages.

For example, a user interface (UI) developer can decide which parts of a UI document are to be encrypted in a device-independent way, leaving it up to the adaptation engine to decide how to encrypt the data.

A user having access to the UI description of a document can easily add encryption functionality to the document.

Figure 2:
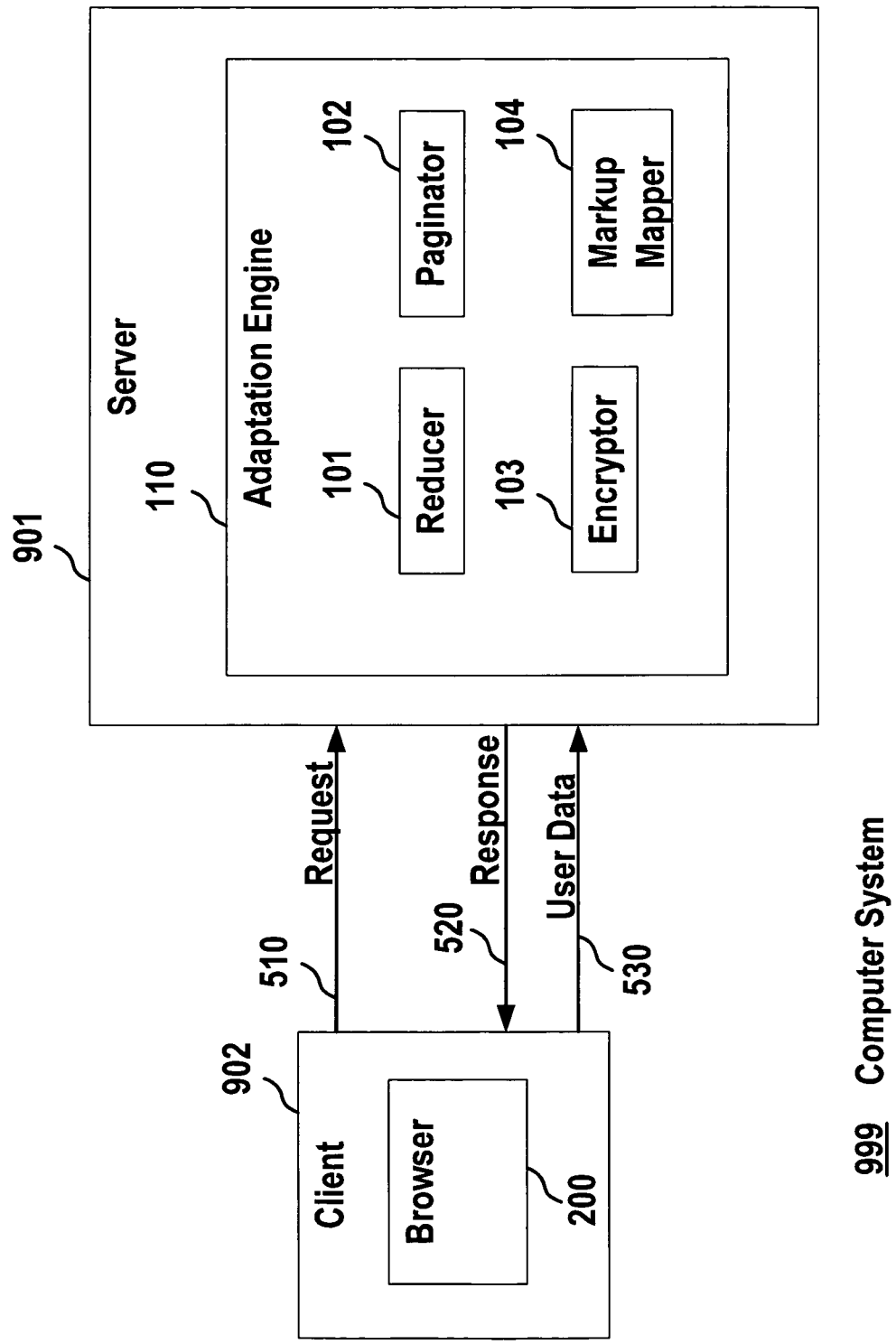
FIG. 2 is a block diagram of an exemplary computer system, consistent with an embodiment of the invention, including the computer of FIG. 1 and at least one client device.

FIG. 2 is a block diagram of an exemplary computer system 999, consistent with an embodiment of the invention, including the server computer 901 described under FIG. 1 and at least one client device 902.

The client device 902 can communicate with the server 901 over any appropriate network. For example, the client device can be a mobile device, such as a mobile phone or a PDA running a browser 200. A user of the client device may trigger a request for a specific document to be displayed by the browser 200. The request is sent 510 from the client 902 and received by an appropriate interface of the server 901.

The server 902 uses its adaptation engine 110, as described under FIG. 1, to generate in response to the request a page or a sub-page from the requested document that can be sent 520 to and displayed by the browser 200 of the client device 902. This response is received by the client including partially encrypted content.

For purposes of illustration, assume a scenario where the server 901 expects the user to input his/her first name (firstName) and bank account number (accountNr) by using the UI of a corresponding page or sub-page 301, 302 displayed by the browser 200.

After the client device 902 has received 520 the partially encrypted page/sub-page from the server 901, the user may enter the expected sensitive data. Before the client sends back 530 this data to the server 901, the data may need to be partially encrypted by the client device 902.

The W3C XForms specification describes how to separate between content, presentation and structure of a document. However, other separation techniques may be equally used together with embodiments of the invention. Coding section 6 is an example of an XForms page/sub-page 301, 302 that the client 902 can use in the above scenario to present a corresponding UI to the user for making the corresponding data entries.

Coding Section 6: XForms Page/Sub-Page on the Client

```
<head>
    <xforms:model xforms:id="formInput">
        <xforms:instancedata>
            <my:firstName></my:firstName>
            <my:accountNr></my:accountNr>
        </xforms:instancedata>
    </xforms:model>
</head>
<body>
    <xforms:input
        xforms:ref="/xforms:instancedata/my:firstName
        xforms:model="formInput">
        <xforms:label>
            Please fill in your first name:
        </xforms:label>
    </xforms:input>
    <xforms:input
        xforms:ref="/xforms:instancedata/my:accountNr
        xforms:model="formInput">
        <xforms:label>
            Please fill in account number:
        </xforms:label>
    </xforms:input>
</body>
```

After the user has made the data entries, the data that is to be sent back 530 to the server 901 may only include the xforms:model part as shown in coding section 7.

Coding Section 7:

```
<xforms:model xforms:id="formInput">
    <xforms:instancedata>
        <my:firstName>John</my:firstName>
        <my:accountNr>123456</my:accountNr>
    </xforms:instancedata>
</xforms:model>
```

In one embodiment of the invention, the client 902 can apply partial data encryption at any level within the document (e.g., the X-Forms document of coding section 6). For identifying to-be-encrypted elements of the xforms:model, the client 902 can parse surrounding tags, such as the "encrypt" tag. The surrounding tags are added by the server 901 when generating the corresponding page/sub-page with the adaptation engine 110 as described under FIG. 1 because the server 901 is aware of the security-level that is required for the various data.

For example, in case only the accountNr is to be encrypted before the data is sent back to the server, the page/sub-page as shown in coding section 8 may be received 520 and used by the client 902.

Coding Section 8:

```
<head>
    <xforms:model xforms:id="formInput">
        <xforms:instancedata>
            <my:firstName></my:firstName>
            <security:encrypt>
                <my:accountNr></my:accountNr>
            </security:encrypt>
        </xforms:instancedata>
    </xforms:model>
</head>
<body>
    <xforms:input
        xforms:ref="//xforms:instancedata/my:firstName
```

```
        xforms:model="formInput">
        <xforms:label>
            Please fill in your first name:
        </xforms:label>
    </xforms:input>
    <xforms:input
        xforms:ref="/xforms:instancedata/my:accountNr
        xforms:model="formInput">
        <xforms:label>
            Please fill in account number:
        </xforms:label>
    </xforms:input>
</body>
```

In the head section of coding section 8, the encrypt tag is prefixed with "security", which represents the prefix of the hypothetical namespace that includes the encrypt tag definition.

After user data entry, the client 902 can apply partial encryption to coding section 8. For example, the XML Encryption or any other appropriate encryption mechanism standard can be used. The encryption mechanism can be part of the browser 200.

In an alternative implementation, the encryption mechanism may not be available at the client device 902. In this case, the server can take the decision to do standard low level encrypting of all pages through, for example, HTTPS during a negotiation phase between the client and the server.

Coding section 9 is an example of the data sent back to the server 901 after encryption has been applied to the accountNr.

Coding Section 9:

```
xforms:model xforms:id="formInput">
    <xforms:instancedata>
        <my:firstName>John</my:firstName>
        <EncryptedData
            Type='foo/xmlenc#Element'
            Xmlns='foo/xmlenc#'>
            <CipherData>
                <CipherValue>
                    5jGytFEd8fa
                </CipherValue>
            </CipherData>
        </EncryptedData>
    </xforms:instancedata>
/xforms:model>
```

Partial encryption in this embodiment of the invention may allow the client 902 to encrypt only the account number element whereas the first name remains in the page/sub-page as clear text.

This is an advantage over conventional techniques that use the input="secret" parameter of the XForms input field to show "*" instead of the actual user data entry on the screen and send back the data with URLEncode, or that encrypt the client-server connection, for example, through HTTPS/SSL.

In general, prior to the selection of the security mechanism, during a security level negotiation phase, the server 901 and the client 902 may agree on the type of encryption to be used for sending data back from client to the server. XML Encryption may be selected as in the above coding section examples. HTTPS may be used in case the client 902 has no security capabilities of its own.

When establishing a session, the client and server may exchange context information through the W3C CC/PP protocol.

This protocol allows them to make use of a "securityProtocols" element which then lists the different security standards implemented on both sides.

For example, the server can send:

```
<securityProtocols>
    XML Encryption; SSL, SSH
</securityProtocols>
``` and, in response, the client can send back:

```
<securityProtocols>
    XML Encryption
</securityProtocols>
```

The server then may take the decision to encrypt specific elements of a document according to the sensitivity of the corresponding data. The same common standard can be used by the client to send back the partially encrypted data.

In case the client sends back:

```
<securityProtocols>
    SSL
</securityProtocols>
```

The server takes the decision to encrypt at the document level, as no other protocol is available in common on both sites. If the client is not able to send its context information through CC/PP, the server may take a default decision, which is to use SSL.

Figure 3:
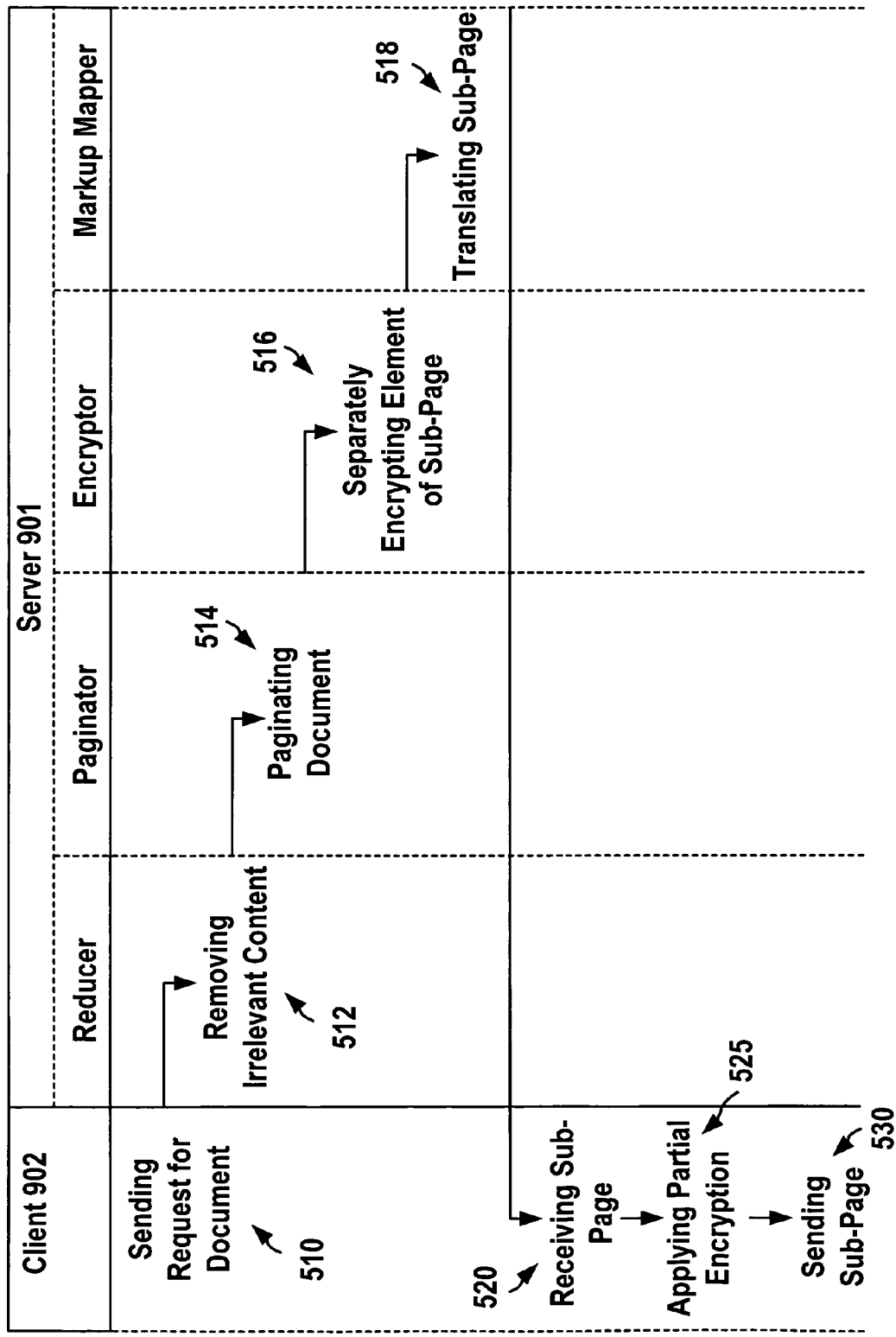
FIG. 3 is a flow chart that illustrates exemplary methods for partial encryption, consistent with embodiments of the invention, which may be implemented with a computer and/or at least one client device.

FIG. 3 is a flow chart to illustrate exemplary methods, consistent with embodiments of the invention, for partial encryption that may be performed by the server computer 901 and/or the client device 902. Steps performed by the client 902 are illustrated in the first column. Steps performed by the server 901 are illustrated in the remaining four columns, where each column corresponds to a component of the adaptation engine 110 run by the server.

In one embodiment, a server-side partial encryption method is provided that includes the step paginating 514 the document 300 into at least one sub-page (301, 302) according to characteristics of a specific device class. The paginating step may be performed by the paginator of the adaptation engine 110.

The encryptor of the adaptation engine may then separately encrypt 516 a to-be-encrypted element of the at least one sub-page (301, 302) by using a partial encryption mechanism known by the client device 902 that belongs to the specific device class.

Advantageously, the reducer of the adaptation engine 110 can remove 512 irrelevant portions from the document 300 with respect to the specific device class before executing the paginating step 514. In case there is no irrelevant information referring to other device classes, the adaptation engine may skip the removing step 512.

After the encrypting step 516, the markup mapper of the adaptation engine 110 can translate 518 not-encrypted elements of the at least one sub-page (301, 302) into a description language known by the client device 902. This step may also be skipped by the adaptation engine in case that the result of the paginating 514 and encrypting 516 steps already deliver sub-pages that are fully compliant with the characteristics of the specific device class.

For identifying the to-be-encrypted element of the at least one sub-page (301, 302), the encryptor may use a corresponding encryption tag surrounding the to-be-encrypted element.

In case the content of the to-be-encrypted element is too large to be presented on a single sub-page at the client device, the paginator may split the to-be-encrypted element over multiple sub-pages (301, 302) by generating corresponding encrypt tags on the multiple sub-pages (301, 302). Each of the corresponding encrypt tags may surround a part of the to-be-encrypted element on the corresponding sub-page and have the same encryption/decryption modalities as the initial to-be-encrypted element.

In one embodiment, the adaptation engine 110 may perform all steps in response to a request for the document 300 received from the client device 902 that belongs to the specific device class. However, the client device is not restricted to specific devices, but can be any computing device that is enabled to communicate with the server computer 902 running the adaptation engine 110. In response to the request, the adaptation engine 110 may send the partially encrypted sub-page (301, 302) from the server computer 901 to the client device 902.

In accordance with another embodiment, a client-side method for partial encryption of the sub-page (301, 302) at the client device is provided that starts with the step receiving 520 the sub-page from the adaptation engine 110. The adaptation engine 110 may generate the sub-page by paginating 514 a document 300 according to characteristics of the specific device class to which the client device belongs. The sub-page (301, 302) includes a to-be-encrypted element.

Then, the client device applies 525 partial encryption to the sub-page (301, 302) by identifying the to-be-encrypted element in the received sub-page and applying a partial encryption mechanism to the to-be-encrypted element.

In one implementation, the client device receives a user data entry in the received sub-page. The data entry can refer to the to-be-encrypted element of the sub-page. In this case, the entered data are subject to the partial encryption in the applying step 525.

After the partial encryption of the sub-page, the client device can send 530 the partially encrypted sub-page back to the server computer 901.

In some embodiments of the invention, the client device 902 may apply a partial encryption mechanism that is permanently available at the client device 902.

In other embodiments, the client device 902 may apply a partial encryption mechanism that is part of a communication protocol used by the client device 902 for communication with the server computer 902.

Embodiments of the invention can be implemented in digital electronic circuitry, or in computer hardware, firmware, software, or in any combination thereof. Embodiments of the invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the adaptation engine 110 for partial document encryption, can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods consistent with the present invention can be performed by one or more programmable processors executing a computer program to perform functions or steps of such methods by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, embodiments of the invention can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Moreover, embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of such a system can be interconnected by any form or medium of digital data communication, e.g., a communication network. Examples of communication networks include a local area network (LAN) and a wide area network (WAN), e.g., the Internet.

Computing systems consistent with the invention can include clients and servers. A client and server are generally remote from each other and typically interact through a communication network. The relationship of client and server arises by virtue of computer programs running on the respective computers and having a client-server relationship to each other.

While illustrative embodiments of the invention have been described herein, the present invention is not limited to the embodiments described herein, but includes any and all embodiments having equivalent elements, modifications, omissions, combinations (e.g., of aspects across various embodiments), adaptations and/or alterations as would be appreciated by those in the art based on the present disclosure.

For example, the order of steps to be performed to implement methods consistent with the present invention is not limited to the order described herein or prescribed in the claims. Further, the limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

Other embodiments of the invention will be apparent to those skilled in the art from consideration of the specification and practice of embodiments of the invention disclosed herein. It is intended, therefore, that the specification and examples be considered as exemplary only, with a true scope and spirit of the invention being indicated by the following claims.

What is claimed is:

1. A system comprising:
a memory device that stores instructions; and
a hardware processor that executes the instructions to create an adaptation engine for partial encryption of a document, the adaptation engine comprising:
  a paginator, the paginator paginating the document into at least one sub-page according to characteristics of a specific device class; and
  an encryptor, the encryptor separately encrypting a to-be-encrypted element of the at least one sub-page using a partial encryption mechanism known by a client device and based on the characteristics of the specific device class,
wherein when the to-be-encrypted element of the at least one sub-page comprises the entire sub-page, the encryptor encrypts the entire sub-page, and when the to-be-encrypted element of the at least one sub-page comprises less than all elements of the entire sub-page, the encryptor encrypts only the to-be-encrypted element, and
further wherein the adaptation engine surrounds the to-be-encrypted element of the at least one sub-page with a corresponding encryption tag.

2. The system of claim 1, wherein the adaptation engine further comprises:
a reducer for removing irrelevant portions from the document with respect to the specific device class before paginating the document.

3. The system of claim 1, wherein, the adaptation engine further comprises:
a markup mapper for translating, after encrypting the to-be-encrypted element of the at least one sub-page of the paginated document, non-encrypted elements of the at least one sub-page into a description language known by the client device.

4. The system of claim 1, wherein the adaptation engine configures the paginator to split the to-be-encrypted element over multiple sub-pages by generating corresponding encrypt tags on the multiple sub-pages, each of the corresponding encrypt tags surrounding a part of the to-be-encrypted element on the corresponding sub-page and having the same encryption/decryption modalities as the to-be-encrypted element.

5. The system of claim 1, wherein the encryptor bases the partial encryption mechanism on an XML encryption.

6. The system of claim 1, wherein the encryptor bases the partial encryption mechanism on jCETaglib.

7. A server computer comprising:
a memory device that stores instructions;
at least one processor configured to execute the instructions to encrypt a document by:
paginating the document into at least one sub-page according to characteristics of a specific device class; and
encrypting a to-be-encrypted element of the at least one sub-page using a partial encryption mechanism known by a client device and based on the characteristics of the specific device class; and
an interface configured to receive a request for the document from the client device and to send in response to the request a sub-page of the requested document to the client device,
wherein the sub-page includes partially encrypted content in a client device compatible language,
wherein when the to-be-encrypted element of the at least one sub-page comprises the entire sub-page, an encryptor encrypts the entire at least one sub-page, and when the to-be-encrypted element of the at least one sub-page comprises less than all elements of the entire at least one sub-page, the encryptor encrypts only the to-be-encrypted element, and
further wherein the to-be-encrypted element of the at least one sub-page is surrounded with a corresponding encryption tag.

8. A client device comprising:
a memory device that stores instructions relating to a browser; and
at least one processor configured to execute the instructions stored in the memory device to run a browser,
the browser comprising an interface configured to send a request for a document to a server computer and to receive from the server computer a sub-page of the requested document generated by an adaptation engine of the server computer based on the characteristics of a specific device class,
the sub-page including a to-be-encrypted element in a client device compatible language based on the characteristics of the specific device class,
wherein when the to-be-encrypted element included in the sub-page comprises the entire sub-page, an encryptor encrypts the entire sub-page, and when partially encrypted content included in the sub-page comprises less than all elements of the entire sub-page, the encryptor encrypts only the partially encrypted content included in the sub-page, and
further wherein the adaptation engine surrounds the to-be-encrypted element of the sub-page with a corresponding encryption tag.

9. The client device of claim 8, further comprising:
means for identifying the to-be-encrypted element in the received sub-page, and
wherein the encryptor applies partial encryption to the to-be-encrypted element.

10. A method for partial encryption of a document, the method comprising:
Paginating, by at least one processor, the document into at least one sub-page according to characteristics of a specific device class; and
separately encrypting, by the at least one processor, a to-be-encrypted element of the at least one sub-page using a partial encryption mechanism known by a client device and based on the characteristics of the specific device class,
wherein when the to-be-encrypted element of the at least one sub-page comprises the entire sub-page, an encryptor encrypts the entire sub-page, and when the to-be-encrypted element of the at least one sub-page comprises less than all elements of the entire sub-page, the encryptor encrypts only the to-be-encrypted element, and
further wherein the to-be-encrypted element of the at least one sub-page is surrounded with a corresponding encryption tag.

11. The method of claim 10, further comprising:
removing irrelevant portions from the document with respect to the specific device class before executing the paginating step.

12. The method of claim 10, further comprising:
translating non-encrypted elements of the at least one sub-page into a description language known by the client device after separately encrypting the to-be-encrypted element.

13. The method of claim 10, further comprising:
identifying the to-be-encrypted element of the at least one sub-page by a corresponding encryption tag surrounding the to-be-encrypted element.

14. The method of claim 10, wherein paginating the document comprises:
splitting the to-be-encrypted element over multiple sub-pages by generating corresponding encrypt tags on the multiple sub-pages, each of the corresponding encrypt tags surrounding a part of the to-be-encrypted element on the corresponding sub-page and having the same encryption/decryption modalities as the initial to-be-encrypted element.

15. The method of claim 10, wherein the method is performed by an adaptation engine executed by the at least one processor in response to a request for the document received from a client device that belongs to the specific device class.

16. The method of claim 15, further comprising:
sending, with the adaptation engine, a partially encrypted sub-page to the client device in response to the request.

17. A method for partial encryption of a sub-page, comprising the following operations executed by at least one processor:
receiving the sub-page at a client device from an adaptation engine, wherein the adaptation engine has generated the sub-page by paginating a document according to characteristics of a specific device class in response to a request of the client device that belongs to the specific device class, the sub-page including a to-be-encrypted element; and
applying partial encryption to the sub-page at the client device by:
identifying the to-be-encrypted element in the received sub-page based on the characteristics of the specific device class; and
applying a partial encryption mechanism to the to-be-encrypted element such that:
when the to-be-encrypted element of the sub-page comprises the entire sub-page, an encryptor encrypts the entire sub-page, and
when the to-be-encrypted element of the sub-page comprises less than all elements of the entire sub-page, the encryptor encrypts only the to-be-encrypted element, wherein the adaptation engine surrounds the to-be-encrypted element of the sub-page with a corresponding encryption tag.

18. The method of claim 17, further comprising:
receiving at the client device a data entry with respect to the to-be-encrypted element of the sub-page, wherein the entered data are subject to the partial encryption.

19. The method of claim 17, further comprising:
sending the partially encrypted sub-page from the client device to a server computer.

20. The method of claim 17, wherein the partial encryption mechanism is permanently available at the client device.

21. The method of claim 17, wherein the partial encryption mechanism is part of a communication protocol used by the client device.

22. A non-transitory computer-readable medium encoded with a computer program product comprising instructions that, when executed by at least one processor, cause the at least one processor of a client device to perform a method for partial encryption of a sub-page, the method comprising:
receiving the sub-page at the client device from an adaptation engine, wherein the adaptation engine has generated the sub-page by paginating a document according to characteristics of a specific device class in response to a request of the client device that belongs to the specific device class, the sub-page including a to-be-encrypted element; and
applying partial encryption to the sub-page at the client device by:
identifying the to-be-encrypted element in the received sub-page based on the characteristics of the specific device class; and
applying a partial encryption mechanism to the to-be-encrypted element such that:
when the to-be-encrypted element of the sub-page comprises the entire sub-page, an encryptor encrypts the entire sub-page, and
when the to-be-encrypted element of the sub-page comprises less than all elements of the entire sub-page, the encryptor encrypts only the to-be-encrypted element,
wherein the adaptation engine surrounds the to-be-encrypted element of the sub-page with a corresponding encryption tag.

* * * * *